United States Patent [19]

Inoue et al.

[11] Patent Number: 4,790,274
[45] Date of Patent: Dec. 13, 1988

[54] VALVE OPERATING MECHANISM FOR INTERNAL COMBUSTION ENGINE

[75] Inventors: Kazuo Inoue; Kenichi Nagahiro; Yoshio Ajiki; Masaaki Katoh, all of Saitama, Japan

[73] Assignee: Honda Giken Kogyo Kabushiki Kaisha, Tokyo, Japan

[21] Appl. No.: 8,741

[22] Filed: Jan. 30, 1987

[51] Int. Cl.$^4$ .................... F01L 1/34; F01L 1/26; F02D 13/06
[52] U.S. Cl. .................... 123/198 F; 123/90.16; 123/90.4; 123/90.44; 123/90.17
[58] Field of Search ............... 123/90.15, 90.16, 90.17, 123/198 F, 90.4, 90.44, 90.39, 90.6

[56] References Cited

U.S. PATENT DOCUMENTS

| | | | |
|---|---|---|---|
| 4,499,870 | 2/1985 | Aoyama | 123/198 F |
| 4,523,550 | 6/1985 | Matsuura | 123/90.16 |
| 4,534,323 | 8/1985 | Kato et al. | 123/90.16 |
| 4,537,165 | 8/1985 | Honda et al. | 123/90.16 |
| 4,545,342 | 10/1985 | Nakano et al. | 123/198 F |
| 4,576,128 | 3/1986 | Kenichi | 123/198 F |
| 4,584,974 | 4/1986 | Aoyama et al. | 123/90.16 |
| 4,589,387 | 5/1986 | Miura et al. | 123/198 F |
| 4,612,884 | 9/1986 | Ajiki et al. | 123/90.16 |
| 4,656,977 | 4/1987 | Nagahiro et al. | 123/90.16 |
| 4,690,110 | 9/1987 | Nishimura et al. | 123/90.17 |

FOREIGN PATENT DOCUMENTS

| | | |
|---|---|---|
| 0186341 | 7/1986 | European Pat. Off. |
| 0213758 | 3/1987 | European Pat. Off. |
| 3613945 | 10/1986 | Fed. Rep. of Germany ... 123/90.16 |

*Primary Examiner*—Willis R. Wolfe
*Attorney, Agent, or Firm*—Lyon & Lyon

[57] ABSTRACT

A valve operating mechanism for operating a plurality of valves of a particular cylinder of an internal combustion engine includes a camshaft rotatable in synchronism with rotation of the internal combustion engine and having at least one cam. At least one of a plurality of cam followers slidably engages the cam for selectively operating the valves according to a cam profile of the cam. The cam followers are selectively interconnected and disconnected to operate the valves in different speed ranges of the internal combustion engine, the speed ranges including a range in which all of the valves remain inoperative. The camshaft has one or two annular raised portions in addition to the cam, and the cam followers include one or two cam followers which slidably engage the raised portion or portions. The valves remain inoperative by the annular portion or portions and are operated in a high-speed range by the cam, or selectively in low- and high-speed ranges by low- and high-speed ranges.

12 Claims, 7 Drawing Sheets

VALVE OPERATING MECHANISM FOR INTERNAL COMBUSTION ENGINE

BACKGROUND OF THE INVENTION

The present invention relates to a valve operating mechanism for an internal combustion engine, including a camshaft rotatable in synchronism with the rotation of the internal combustion engine and having integral cams for operating a pair of intake or exhaust valves, and rocker arms or cam followers angularly movable supported on a rocker shaft for opening and closing the intake or exhaust valves in reponse to rotation of the cams.

Japanese Laid-Open Patent Publication No. 59(1984)-226216, for example, discloses a valve operating mechanism for use in an internal combustion engine having a plurality of intake or exhaust valves per engine cylinder. Some of the intake or exhaust valves remain closed when the engine operates at a low speed. If the intake or exhaust valves of a particular engine cylinder of a multicylinder internal combustion engine could be kept inoperative in order to cut off the operation of the particular engine cylinder, fuel consumption would be reduced by stopping the operation of the intake or exhaust valves of the particular engine cylinder while the engine operates in a low-speed range. However, no satisfactory devices have been available in the part to achieve such a task.

SUMMARY OF THE INVENTION

It is an object of the present invention to provide a valve operating mechanism for an internal combustion engine, which is of a relatively simple structure, for making the intake or exhaust valves of a particular engine cylinder inoperative for better fuel economy.

According to the present invention, there is provided a valve operating mechanism for operating a plurality of valves of a particular cylinder of an internal combustion engine, comprising a camshaft rotatable in synchronism with rotation of the internal combustion engine and having at least one cam, a plurality of cam followers at least one of which slidably engages the cam for selectively operating the valves according to a cam profile of the cam, and means for selectively interconnecting and disconnecting the cam followers to operate the valves in different speed ranges of the internal combustion engine, the speed ranges including a range in which all of the valves remain inoperative.

The camshaft has one or two annular raised portions in addition to the cam, and the cam followers include one or two cam followers which slidably engage the raised portion or portions. The valves remain inoperative by the annular portion or portions and are operated in a high-speed range by the cam, or selectively in low- and high-speed ranges by low- and high-speed cams.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
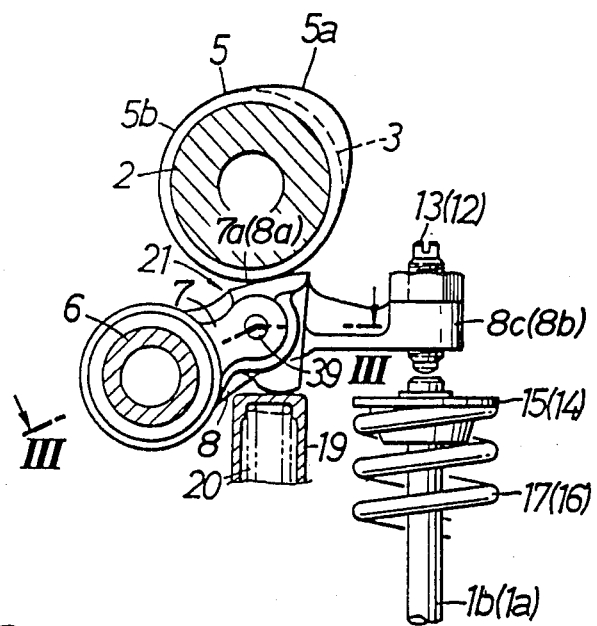
FIG. 1 is a vertical cross-sectional view of a valve operating mechanism according to an embodiment of the present invention, the view being taken along line I—I of FIG. 2.

Like or corresponding parts are denoted by like or corresponding reference characters throughout several views.

Figure 2:
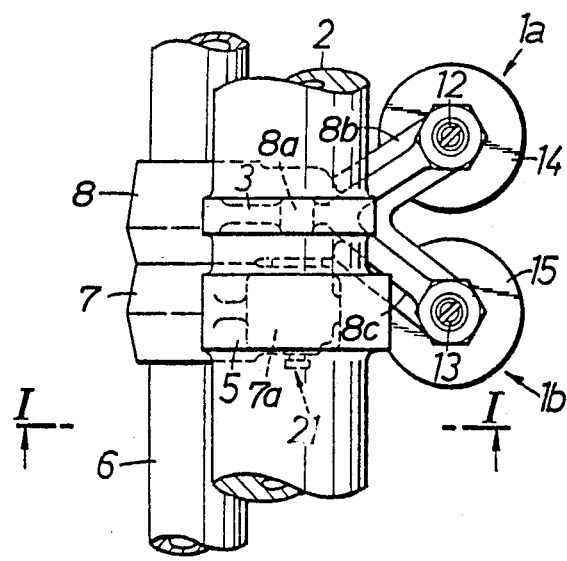
FIG. 2 is a plan view of the valve operating mechanism shown in FIG. 1.

FIGS. 1 and 2 show a valve operating mechanism according to an embodiment of the present invention. The valve operating mechanism is incorporated in an internal combustion engine for use with a particular engine cylinder having a pair of intake valves 1a, 1b for introducing an air-fuel mixture into a combustion chamber defined in an engine body.

The valve operating mechanism comprises a camshaft 2 rotatable in synchronism with rotation of the engine at a speed ratio of ½ with respect to the speed of rotation of the engine. The camshaft 2 has an annular raised portion 3 and a cam 5 which are integrally disposed on the circumference of the camshaft 2. The valve operating mechanism also has a rocker shaft 6 extending parallel to the camshaft 2, and first and second rocker arms or cam followers 7, 8 angularly movably supported on the rocker shaft 6 and held against the cam 5 and the raised portion 3, respectively, on the camshaft 2. The intake valves 1a, 1b remain closed or inoperative by the raised portion 3 in a low-speed range of the engine.

The camshaft 2 is rotatably disposed above the engine body. The raised portion 3 is disposed in a position corresponding to an intermediate position between the intake valves 1a, 1b, as viewed in FIG. 2. The cam 5 is positioned substantially in line with the intake valve 1b. The raised portion 3 has a circumferential profile in the shape of a circle corresponding to the base circle 5b of the cam 5. The cam 5 has a cam lobe 5a projecting radially outwardly from the base circle 5b.

The rocker shaft 6 is fixed below the camshaft 2. The first cam follower 7 pivotally supported on the rocker shaft 6 is aligned with the cam 5, and the second cam follower 8 pivotally supported on the rocker shaft 6 is aligned with the raised portion 3. The cam followers 7, 8 have on their upper surfaces cam slippers 7a, 8a, respectively, held in sliding contact with the cam 5 and the raised portion 3, respectively. The second cam follower 8 includes a pair of arms 8b, 8c having distal ends positioned above the intake valves 1a, 1b, respectively. Tappet screws 12, 13 are threaded through the distal ends of the arms 8b, 8c and have tips engageable respectively with the upper ends of the valve stems of the intake valves 1a, 1b.

Flanges 14, 15 are attached to the upper ends of the valve stems of the intake valves 1a, 1b. The intake valves 1a, 1b are normally urged to close the intake ports by compression coil springs 16, 17 disposed under compression around the valve stems between the flanges 14, 15 and the engine body.

A bottomed cylindrical lifter 19 is disposed in abutment against a lower surface of the first cam follower 7. The lifter 19 is normally urged upwardly by a compression spring 20 of relatively weak resiliency interposed between the lifter 19 and the engine body for resiliently biasing the cam slipper 7a of the first cam follower 7 slidably against the cam 5.

Figure 3:
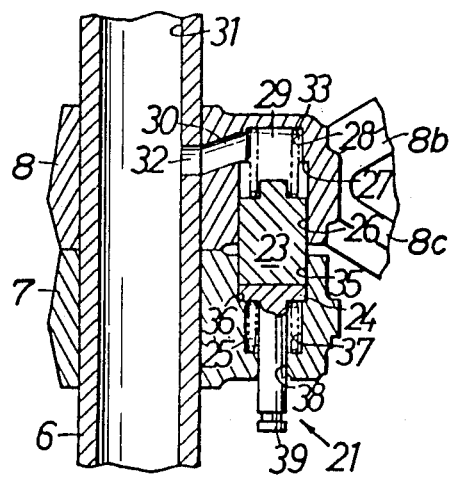
FIG. 3 is a cross-sectional view taken along line III—III of FIG. 1, showing first and second cam followers connected to each other.

As illustrated in FIG. 3, the first and second cam followers 7, 8 have confronting side walls held in sliding contact with each other. A selective coupling 21 is operatively disposed in and between the first and second cam followers 7, 8 for selectively disconnecting the cam followers 7, 8 from each other for relative displacement and also for interconnecting the cam followers 7, 8 for their movement in unison.

The selective coupling 21 comprises a piston 23 movable between a position in which it interconnects the first and second cam followers 7, 8 and a position in which it disconnects the first and second cam followers 7, 8 from each other, a circular stopper 24 for limiting the movement of the piston 23, and a coil spring 25 for urging the stopper 24 to move the piston 23 toward the position to disconnect the first and second cam followers 7, 8 from each other.

The second cam follower 8 has a first guide hole 26 opening toward the first cam follower 7 and extending parallel to the rocker shaft 6. The second cam follower 8 also has a smaller-diameter hole 28 near the closed end of the first guide hole 26, with a step or shoulder 27 being defined between the smaller-diameter hole 28 and the first guide hole 26. The piston 23 is slidably fitted in the first guide hole 26. The piston 23 and the closed end of the smaller-diameter hole 28 define therebetween a hydraulic pressure chamber 29.

The second cam follower 8 has a hydraulic passage 30 defined therein in communication with the hydraulic pressure chamber 29. The rocker shaft 6 has a hydraulic passage 31 defined axially therein and coupled to a source (not shown) of hydraulic pressure through a suitable hydraulic pressure control mechanism. The hydraulic passages 30, 31 are held in communication with each other through a hole 32 defined in a side wall of the rocker shaft 6, irrespective of how the second cam follower 8 is angularly moved about the rocker shaft 6.

The first cam follower 7 has a second guide hole 35 opening toward the second cam follower 8 in registration with the first guide hole 26 in the second cam follower 8. The circular stopper 24 is slidably fitted in the second guide hole 35. The first cam follower 7 also has a smaller-diameter hole 37 near the closed end of the second guide hole 35, with a step or shoulder 36 defined between the second guide hole 35 and the smaller-diameter hole 37 for limiting movement of the circular stopper 24. The first cam follower 7 also has a through hole 38 defined coaxially with the smaller-diameter hole 37. A guide rod 39 joined integrally and coaxially to the circular stopper 24 extends through the hole 38. The coil spring 25 is disposed around the guide rod 39 between the stopper 24 and the closed end of the smaller-diameter hole 37.

The piston 23 has an axial length selected such that when one end of the piston 23 abuts against the step 27, the other end thereof is positioned just between and hence lies flush with the sliding side walls of the first and second cam followers 7, 8, and when the piston 23 is moved into the second guide hole 35 until it displaces the stopper 24 into abutment against the step 36, said one end of the piston 23 remains in the first guide hole 26 and hence the piston 23 extends between the first and second cam followers 7, 8. The piston 23 is normally urged toward the first cam follower 7 under the resiliency of a coil spring 33 disposed in the hydraulic pressure chamber 29 and acting between the piston 23 and the closed bottom of the smaller-diameter hole 28. The resilient force of the spring 33 set under compression in the hydraulic pressure chamber 29 is selected to be smaller than that of the spring 25 set in place under compression.

Figure 4:
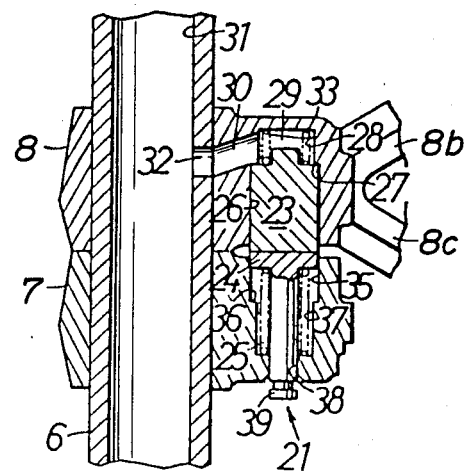
FIG. 4 is a cross-sectional view similar to FIG. 3, showing the first and second cam followers disconnected from each other.
Figure 5:
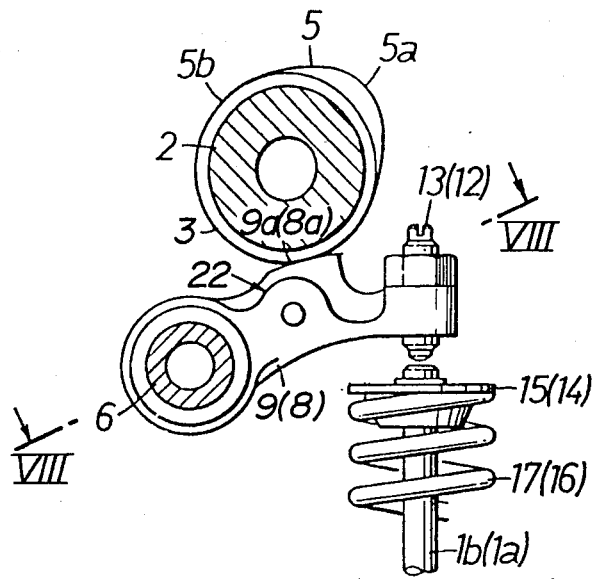
FIG. 5 is a vertical cross-sectional view of a valve operating mechanism according to another embodiment of the present invention, the view being taken along line V—V of FIG. 6.
Figure 6:
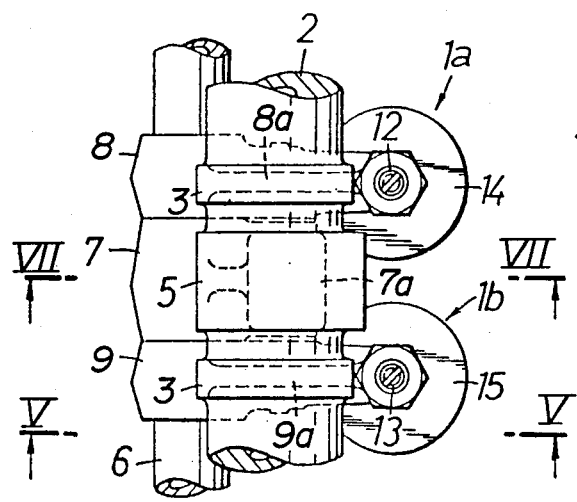
FIG. 6 is a plan view of the valve operating mechanism shown in FIG. 5.
Figure 7:
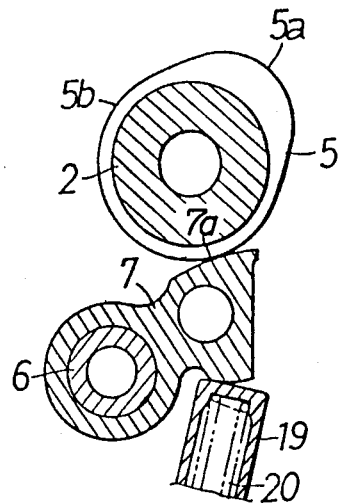
FIG. 7 is a cross-sectional view taken along line VII—VII of FIG. 6.

Operation of the valve operating mechanism will be described with reference to FIGS. 3 and 4. When the engine is to operate in a low-speed range, the selective coupling 21 is actuated to disconnect the first and second cam followers 7, 8 from each other as illustrated in FIG. 4. More specifically, the hydraulic pressure is released by the hydraulic pressure control mechanism from the hydraulic pressure chamber 29, thus allowing the stopper 24 to move toward the second cam follower 8 under the resiliency of the spring 25 until the piston 23 abuts against the step 27. When the piston 23 engages the step 27, the mutually contacting ends of the piston 23 and the stopper 24 lie flush with the sliding side walls of the first and second cam followers 7, 8. Therefore, the first and second cam followers 7, 8 are held in mutually sliding contact for relative angular movement.

With the first and second cam followers 7, 8 being thus disconnected, the first cam follower 7 is angularly moved in sliding contact with the cam 5, whereas the second cam follower 8 is held in sliding contact with the raised portion 3. Since the raised portion 3 does not impose any camming action on the second cam follower 8, the intake valves 1a, 1b remain closed. The swinging movement of the first cam follower 7 which is caused by the cam 5 does not affect the intake valves 1a, 1b as the first cam follower 7 is disconnected from the second cam follower 8 at this time. Any frictional loss of the valve operating mechanism is relatively low because the first cam follower 7 is held in sliding contact with the cam 5 under the relatively small resilient force of the spring 20.

During low-speed operation of the engine, therefore, the intake valves 1a, 1b remain closed or inoperative for reducing fuel consumption.

For high-speed operation of the engine, the first and second cam followers 7, 8 are interconnected by the selective coupling 21, as shown in FIG. 3. More specifically, the hydraulic pressure chamber 29 of the selective coupling 21 is supplied with hydraulic pressure to cause the piston 23 to push the support 24 into the second guide hole 35 against the resiliency of the spring 25 until the stopper 24 engages the step 36. The first and second cam followers 7, 8 are not connected to each other for angular movement in unison.

At this time, the second cam follower 8 is caused to swing the first cam follower 7. Therefore, the intake valves 1a, 1b alternately open and close the respective intake ports at the valve timing and valve lift according to the profile of the cam 5.

FIGS. 5 through 9 show a valve operating mechanism according to another embodiment of the present invention.

The valve operating mechanism comprises a camshaft 2 rotatable in synchronism with rotation of the engine at a speed ratio of ½ with respect to the speed of rotation of the engine. The camshaft 2 has a pair of annular raised portions 3 and a cam 5 which are integrally disposed on the circumference of the camshaft 2, the cam 5 being disposed between the raised portions 3. The valve operating mechanism also has a rocker shaft 6 extending parallel to the camshaft 2, and first through third cam followers 7, 8, 9 angularly movably supported on the rocker shaft 6 and held against the cam 5 and the raised portions 3, respectively, on the camshaft 2. A pair of intake valves 1a, 1b remains inoperative by the raised portions 3 in a low-speed range of the engine.

The camshaft 2 is rotatably disposed above the engine body. The cam 5 is disposed in a position corresponding to an intermediate position between the intake valves 1a, 1b, as viewed in FIG. 6. The raised portions 3 are positioned substantially in line with the intake valves 1a, 1b, respectively. The raised portions 3 have a circumferential profile in the shape of a circle corresponding to the base circle 5b of the cam 5. The cam 5 has a cam lobe 5a projecting radially outwardly from the base circle 5b.

The rocker shaft 6 is fixed below the camshaft 2. The first cam follower 7 pivotally supported on the rocker shaft 6 is aligned with the cam 5, and the second and third cam followers 8, 9 pivotally supported on the rocker shaft 6 are aligned respectively with the raised portions 3. The cam followers 7, 8, 9 have on their upper surfaces cam slippers 7a, 8a, 9a, respectively, held in sliding contact with the cam 5 and the raised portions 3, respectively. The second and third cam followers 8, 9 have distal ends positioned above the intake valves 1a, 1b, respectively. Tappet screws 12, 13 are threaded through the distal ends of the cam followers 8, 9 and have tips engagable respectively with the upper ends of the valve stems of the intake valves 1a, 1b.

Flanges 14, 15 are attached to the upper ends of the valve stems of the intake valves 1a, 1b. The intake valves 1a, 1b are normally urged to close the intake ports by compression coil springs 16, 17 disposed under compression around the valve stems between the flanges 14, 15 and the engine body.

A bottomed cylindrical lifter 19 is disposed in abutment against a lower surface of the first cam follower 7. The lifter 19 is normally urged upwardly by a compression spring 20 of relatively weak resiliency interposed between the lifter 19 and the engine body for resiliently biasing the cam slipper 7a of the first cam follower 7 slidably against the cam 5.

Figure 8:
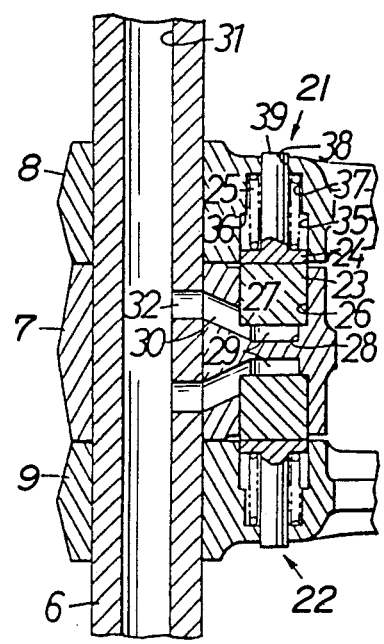
FIG. 8 is a cross-sectional view taken along line VIII—VIII of FIG. 5, showing first through third cam followers disconnected from each other.

As illustrated in FIG. 8, the first and second cam followers 7, 8 have confronting side walls held in sliding contact with each other. A first selective coupling 21 is operatively disposed in and between the first and second cam followers 7, 8 for selectively disconnecting the cam followers 7, 8 from each other for relative displacement and also for interconnecting the cam followers 7, 8 for their movement in unison. Likewise, the first and third cam followers 7, 9 have confronting side walls held in sliding contact with each other. A second selective coupling 22 is operatively disposed in and between the first and third cam followers 7, 9 for selectively disconnecting the cam followers 7, 9 from each other for relative displacement and also for interconnecting the cam followers 7, 9 for their movement in unison.

The first and second selective couplings 21, 22 are of an identical construction, and hence only the first selective coupling 21 will hereinafter be described in detail.

The first selective coupling 21 comprises a piston 23 movable between a position in which it interconnects the first and second cam followers 7, 8 and a position in which it disconnects the first and second cam followers 7, 8 from each other, a circular stopper 24 for limiting the movement of the piston 23, and a coil spring 25 for urging the stopper 24 to move the piston 23 toward the position to disconnect the first and second cam followers 7, 8 from each other.

The first cam follower 7 has a first guide hole 26 opening toward the second cam follower 8 and extending parallel to the rocker shaft 6. The first cam follower 7 also has a smaller-diameter hole 28 near the closed end of the first guide hole 26, with a step or shoulder 27 being defined between the smaller-diameter hole 28 and the first guide hole 26. The piston 23 is slidably fitted in the first guide hole 26. The piston 23 and the closed end of the smaller-diameter hole 28 define therebetween a hydraulic pressure chamber 29.

The first cam follower 7 has a hydraulic passage 30 defined therein in communication with the hydraulic pressure chamber 29. The rocker shaft 6 has a hydraulic passage 31 defined axially therein and coupled to a soruce (not shown) of hydraulic pressure through a suitable hydraulic pressure control mechanism. The hydraulic passages 30, 31 are held in communication with each other through a hole 32 defined in a side wall of the rocker shaft 6, irrespective of how the first cam follower 7 is angularly moved about the rocker shaft 6.

The second cam follower 8 has a second guide hole 35 opening toward the first cam follower 7 in registration with the first guide hole 26 in the first cam follower 7. The circular stopper 24 is slidably fitted in the second guide hole 35. The second cam follower 8 also has a smaller-diameter hole 37 near the closed end of the second guide hole 35, with a step or shoulder 36 defined between the second guide hole 35 and the smaller-diameter hole 37 for limiting movement of the circular stopper 24. The second cam follower 8 also has a through hole 38 defined coaxially with the smaller-diameter hole 37. A guide rod 39 joined integrally and coaxially to the circular stopper 24 extends through the hole 38. The coil spring 25 is disposed around the guide rod 39 between the stopper 24 and the closed end of the smaller-diameter hole 37.

The piston 23 has an axial length selected such that when one end of the piston 23 abuts against the step 27, the other end thereof is positioned just between and hence lies flush with the sliding side walls of the first and second cam followers 7, 8, and when the piston 23 is moved into the second guide hole 35 until it displaces the stopper 24 into abutment against the step 36, said one end of the piston 23 remains in the first guide hole 26 and hence the piston 23 extends between the first and second cam followers 7, 8. The hydraulic passage 31 is shared by the first and second selective couplings 21, 22, which are therefore actuated simultaneously under fluid pressure supplied via the hydraulic passage 31.

Operation of the valve operating mechanism will be described with reference to FIGS. 8 and 9. When the engine is to operate in a low-speed range, the first and second selective couplings 21, 22 are actuated to disconnect the first through third cam followers 7, 8, 9 from each other as illustrated in FIG. 8. More specifically, the hydraulic pressure is released by the hydraulic pressure control mechanism from the hydraulic pressure chamber 29, thus allowing the stopper 24 to move toward the first cam follower 7 under the resiliency of the spring 25 until the piston 23 abuts against the step 27. When the piston 23 engages the step 27, the mutually contacting ends of the piston 23 and the stopper 24 of the first selective coupling 21 lie flush with the sliding walls of the first and second cam followers 7, 9. Likewise, the mutually contacting ends of the piston 23 and the stopper 24 of the second selective coupling 22 lie flush with the sliding side walls of the first and third cam followers 7, 9. Thus, the first, second, and third cam followers 7, 8, 9 are held in mutually sliding contact for relative angular movement.

With the first through third cam followers 7, 8, 9 being thus disconnected, the second and third cam followers 8, 9, which slidingly contact the raised portions 3, are not angularly moved, keeping the intake valves 1a, 1b closed. The second and third cam followers 8, 9 are not affected by the angular movement of the first cam follower 7 in sliding contact with the cam 5. Any frictional loss of the valve operating mechanism is relatively low because the first cam follower 7 is held in sliding contact with the cam 5 under the relatively small resilient force of the spring 20.

During low-speed operation of the engine, therefore, fuel consumption is reduced inasmuch as the intake valves 1a, 1b remain closed or inoperative.

Figure 9:
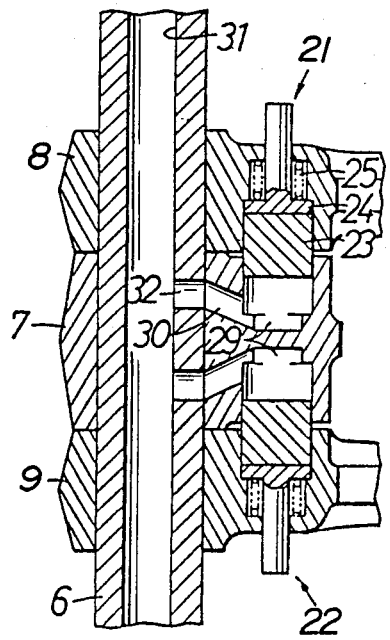
FIG. 9 is a cross-sectional view similar to FIG. 8, showing the first through third cam followers interconnected.

When the engine is to operate at a high speed, the first through third cam followers 7, 8, 9 are interconnected by the first and second selective couplings 21, 22, as shown in FIG. 9, by supplying hydraulic pressure into the hydraulic-pressure chambers 29 of the first and second selective couplings 21, 22. More specifically, the pistons 23 are forced by the supplied hydraulic pressure into the second guide holes 35 while pressing the stoppers 24 against the resilient forces of the springs 25 until the stoppers 24 are pressed against the steps 36. The first through third cam followers 7, 8, 9 are interconnected by the first and second selective couplings 21, 22 so that they are caused to swing in unison by the cam 5. As a consequence, the intake valves 1a, 1b alternately open and close the respective intake ports at the valve timing and valve lift according to the profile of the cam 5.

Figure 10:
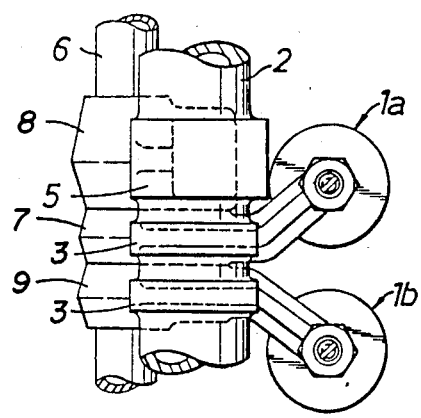
FIG. 10 is a plan view of a valve operating mechanism according to still another embodiment of the present invention.

FIG. 10 shows a valve operating mechanism according to still another embodiment of the present invention.

The camshaft 2 has a cam 5 and a pair of adjacent annular raised portions 3 disposed on one side of the cam 5. The first and third cam followers 7, 9 are held in sliding contact with the raised portions 3, respectively, and engage the intake valves 1a, 1b, respectively. The second cam follower 8 is held in sliding contact with the cam 5. The intake valves 1a, 1b are controlled in different speed ranges by the mechanism shown in FIGS. 8 and 9. In the low-speed range, the intake valves 1a, 1b remain closed or inoperative since the first and third cam followers 7, 9 are not angularly moved. In the high-speed range, the intake valves 1a, 1b are caused to alternately open and close their intake ports according to the cam profile of the cam 5.

Figure 12:
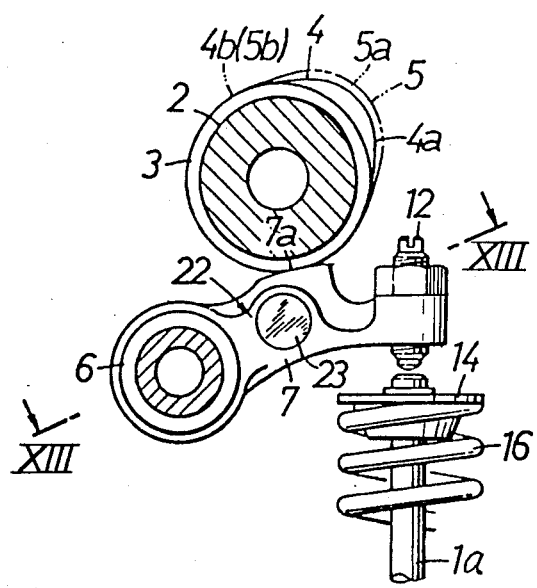
FIG. 12 is a cross-sectional view taken along line XII—XII of FIG. 11.
Figure 11:
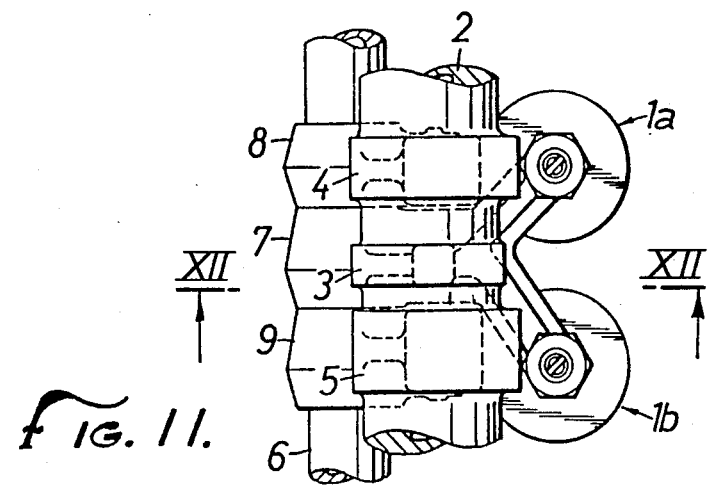
FIG. 11 is a plan view of a valve operating mechanism according to a still further embodiment of the present invention.

According to a still further embodiment shown in FIGS. 11 and 12, the camshaft 2 has an annular raised portion 3, a low-speed cam 4, and a high-speed cam 5 which are integrally disposed on the camshaft 2, the annular raised portion 3 being positioned between the low- and high-speed cams 4, 5. The raised portion 3 has a circumferential profile in the shape of a circle corresponding to the base circles 4b, 5b of the low- and high-speed cams 4, 5. The low-speed cam 4 has a cam lobe 4a projecting radially outwardly from the base circle 4b, and the high-speed cam 5 has a cam lobe 5a projecting radially outwardly from the base circle 5b to a greater extent than the cam lobe 4a, the cam lobe 5a also having a larger angular extent than the cam lobe 4a.

The first cam follower 7 is held in sliding contact with the raised portion 3, whereas the second and third cam followers 8, 9 are held in sliding contact with the low- and high-speed cams 4, 5, respectively. The first cam follower 7 has a pair of arm ends engageable with the upper ends of the valve stems of a pair of intake valves 1a, 1b.

Figure 13:
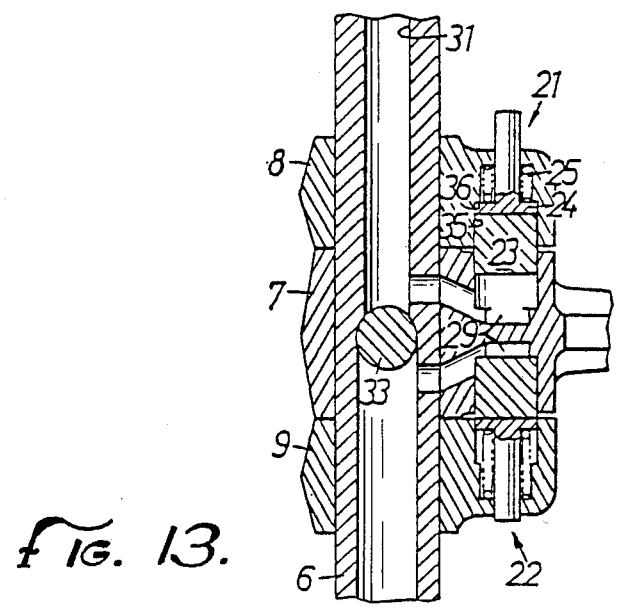
FIG. 13 is a cross-sectional view taken along line XIII—XIII of FIG. 12, showing a mechanism for actuating the valve operating mechanism of FIG. 11.

The first through third cam followers 7, 8, 9 shown in FIG. 11 are operated by a mechanism as shown in FIG. 13. the structure of FIG. 13 is substantially similar to that of FIGS. 8 and 9, except that a steel ball 33 is forcibly fitted in the hydraulic passage 31 to divide it into two independent passages for separately operating the first and second selective couplings 21, 22. In the low-speed range, the first through second cam followers 7, 8, 9 are disconnected from each other as shown in FIG. 8, and hence the intake valves 1a, 1b remain closed as the first cam follower 7 is not caused to swing. In the medium-speed range, the first and second cam followers 7, 8 are interconnected, while the first and third cam followers 7, 9 are disconnected from each other, as shown in FIG. 13. Thus, the intake valves 1a, 1b are operated by the low-speed cam 4. In the high-speed range, the first through third cam followers 7, 8, 9 are interconnected as shown in FIG. 9 to enable the intake valves 1a, 1b to be operated by the high-speed cam 5.

Figure 14:
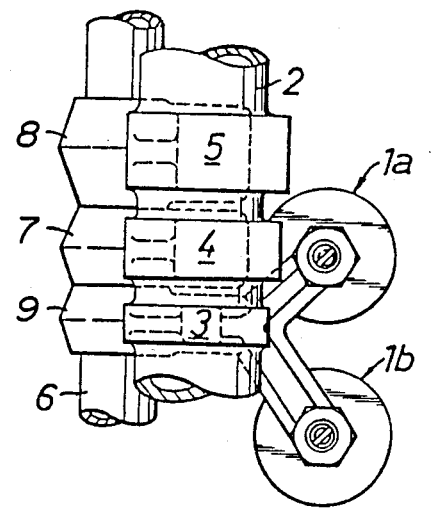
FIG. 14 is a plan view of a valve operating mechanism according to a yet still further embodiment of the present invention.
Figure 15:
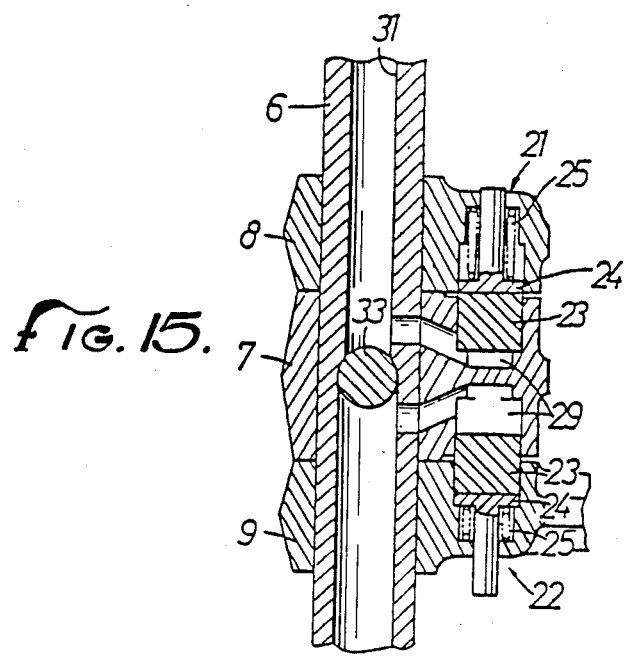
FIG. 15 is a cross-sectional view similar to FIGS. 8, 9 and 13, showing a mechanism for actuating the valve operating mechanism of FIG. 14.

FIG. 14 shows a valve operating mechanism according to a yet still further embodiment of the present invention. In FIG. 14, the low-speed cam 4 is positioned between the high-speed cam 5 and the annular raised portion 3. The first and second cam followers 7, 8 are held in sliding contact with the low- and high-speed cams 4, 5, and the third cam follower 9 engaging the intake valves 1a, 1b is held in sliding contact with the raised portion 3. The mechanism shown in FIG. 15, which is similar to FIGS. 8 and 9 and identical to that of FIG. 13, is employed to control the intake valves 1a, 1b. In the low-speed range, the first through second cam followers 7, 8, 9 are disconnected from each other as shown in FIG. 8, and hence the intake valves 1a, 1b remain closed. In the medium-speed range, the first and third cam followers 7, 9 are interconnected, while the first and second cam followers 7, 8 are disconnected from each other, as shown in FIG. 15. Thus, the intake valves 1a, 1b are operated by the low-speed cam 4. In the high-speed range, the first through third cam followers 7, 8, 9 are interconnected as shown in FIG. 9 to operate the intake valves 1a, 1b according to the cam profile of the high-speed cam 5.

While the intake valves 1a, 1b are shown as being operated by each of the valve operating mechanisms, exhaust valves may also be operated by the valve operating mechanisms according to the present invention. In such a case, unburned components due to exhaust gas turbulence can be reduced in low-speed operation of the engine, whereas high engine output power and torque can be generated by reducing resistance to the flow of an exhaust gas from thee combustion chamber in high-speed operation of the engine.

Although certain preferred embodiments have been shown and described, it should be understood that many changes and modifications may be made therein without departing from the scope of the appended claims.

We claim:

1. A valve operating mechanism for operating a plurality of valves of a particular cylinder of an internal combustion engine, comprising:
   a camshaft rotatable in synchronism with rotation of the internal combustion engine and having at least one cam;
   a plurality of cam followers, one of which slidably engages with said cam for selectively operating the valves according to a cam profile of said cam; and
   means for selectively interconnecting and disconnecting said cam followers to operate the valves differently in different speed ranges of the internal combustion engine, said speed ranges including a range in which all of the valves remain inoperative.

2. A valve operating mechanism according to claim 1, wherein said camshaft has two annular raised portions with one positioned on each said of said cam, said cam followers including cam followers which slidably engage said raised portions, respectively, for controlling said valves, said means including means for selectively keeping said valves inoperative in said range with said raised portions and operating said valves in a high-speed range with said cam.

3. A valve operating mechanism according to claim 1, wherein said camshaft has an annular raised portion positioned adjacent to said cam, said cam followers including a cam follower which slidably engages said raised portion for controlling said valves, said means including means for selectively keeping said valves inoperative in said range with said raised portion and operating said valves in a high-speed range with said cam.

4. A valve operating mechanism according to claim 1, wherein said camshaft has two adjacent annular raised portions positioned on one side of said cam, said cam followers including cam followers which slidably engage said raised portions, respectively, for controlling said valves, said means including means for selectively keeping said valves inoperative in said range with said raised portions and operating said valves in a high-speed range with said cam.

5. A valve operating mechanism according to claim 1, wherein said camshaft has an annular raised portion, a low-speed cam, and a high-speed cam, said raised portion being positioned between said low- and high-speed cams, said cam followers including cam followers which slidably engage said low- and high-speed cams, respectively, and a cam follower which slidably engages said raised portion for controlling said valves, said means including means for selectively keeping said valve inoperative in said range with said raised portion and operating said valves in a low-speed range with said low-speed cam and in a high-speed range with said high speed cam.

6. A valve operating mechanism according to claim 1, wherein said camshaft has an annular raised portion, a low-speed cam, and a high-speed cam, said low-speed cam being positioned between said raised portion and said high-speed cams, said cam followers including cam followers which slidably engage said low- and high-speed cams, respectively, and a cam follower which slidably engages said raised portion for controlling said valves, said means including means for selectively keeping said valves inoperative in said range with said raised portion and operating said valves in a low-speed range with said low-speed cam and in a high-speed range with said cam.

7. A valve operating mechanism for operating a plurality of valves of a particular cylinder of an internal combustion engine, comprising:
   a camshaft carrying an annular raised portion for maintaining said valves in a closed condition and cam means having a cam profile for sequentially opening and closing said valves,
   first cam follower means slidably engaging said raised portion and operatively connecting said valves thereto,
   second cam follower means slidably engaging said cam means, and
   means for selectively interconnecting and disconnecting said first and second cam followers at a predetermined condition of engine operation whereby said raised portion is effective to operate said valves during one range of engine operation and said cam means is effective to operate said valves during another range of engine operation.

8. A valve operating mechanism as recited in claim 7 in which said cam means includes a cam profile comprising a base circle and a cam lobe extending radially therefrom and said annular raised portion has a diameter corresponding substantially to that of said base circle.

9. A valve operating mechanism as recited in claim 8 in which said first cam follower means is a bifurcate member effective to operatively connect said valves to said raised portion.

10. A valve operating mechanism as recited in claim 9 in which said cam means includes a low-speed and a high-speed cam and said interconnecting and disconnecting means including means for connecting and disconnecting said second cam follower means to said first cam followers means for operation of said first cam follower means in response to either said raised portion, said low-speed cam or said high-speed cam.

11. A valve operating mechanism as recited in claim 10 in which said interconnecting and disconnecting means are effective to selectively connect said first cam follower means with the adjacent second cam follower means.

12. A valve operating mechanism as recited in claim 11 in which said first cam follower means is positioned intermediate the respective of said second cam follower means and said interconnecting and disconnecting means are effective to selectively connect said first cam follower means with either or both of said respective second cam follower means.

* * * * *